United States Patent [19]

Schneck

[11] Patent Number: 5,291,203
[45] Date of Patent: Mar. 1, 1994

[54] RADAR DETECTION HELMET

[76] Inventor: Eric H. Schneck, 211 High St., Wareham, Mass. 02571

[21] Appl. No.: 27,433

[22] Filed: Mar. 8, 1993

[51] Int. Cl.$^5$ .................................. G01S 7/36
[52] U.S. Cl. ............................................ 342/20
[58] Field of Search ................................ 342/20

[56]  References Cited
U.S. PATENT DOCUMENTS 4,719,462  1/1988  Hawkins ..................... 342/20
5,034,747  7/1991  Donahue ..................... 342/20

Primary Examiner—Mark Hellner
Attorney, Agent, or Firm—Leon Gilden

[57]  ABSTRACT

A radar detection helmet is arranged to include radar circuitry, as well as a speaker member, mounted within the helmet, and further including a positionable light-emitting diode housing arranged for ease of positioning and observation of the light-emitting diode in use of the radar detection apparatus.

2 Claims, 4 Drawing Sheets

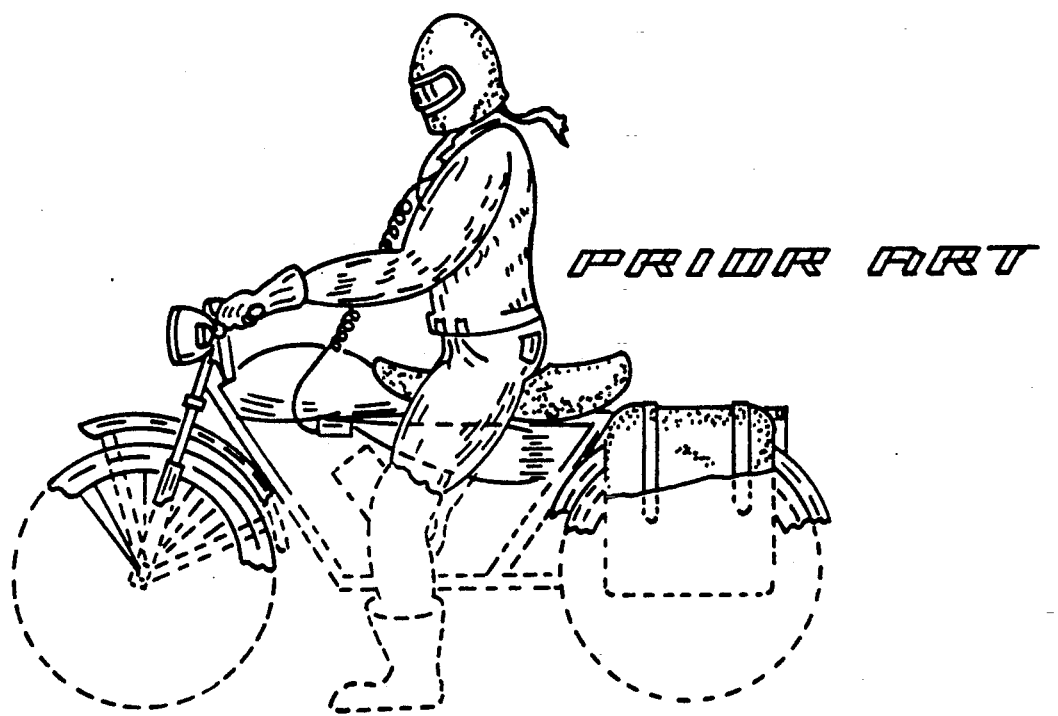
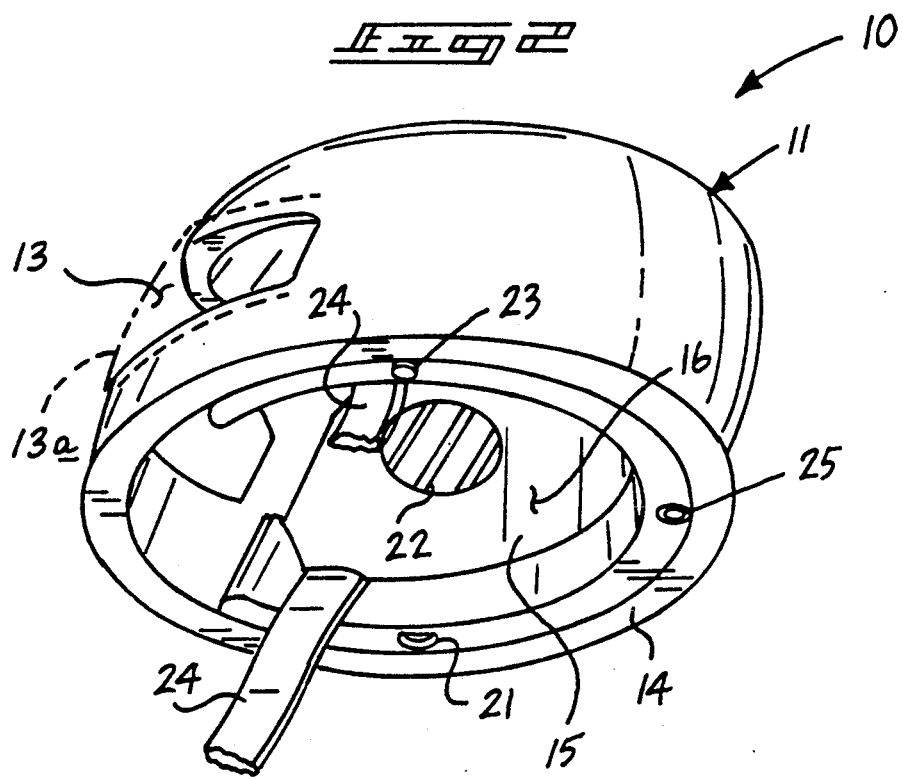

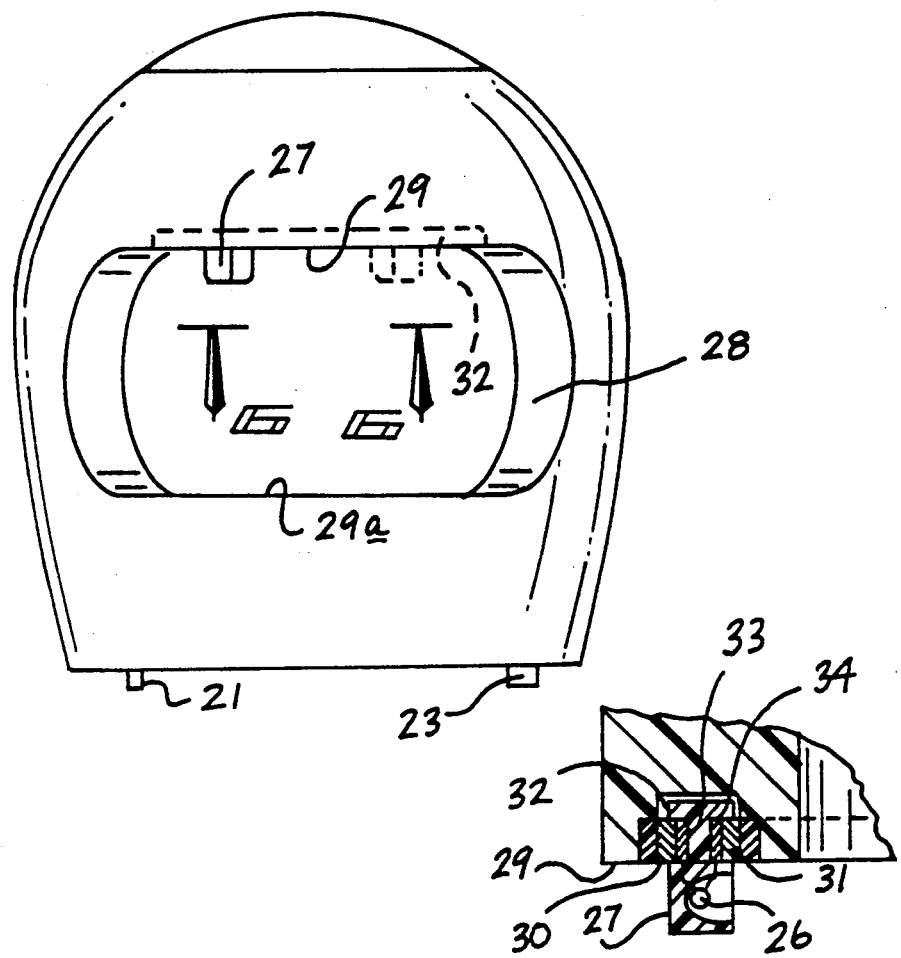
FIG. 5
FIG. 7
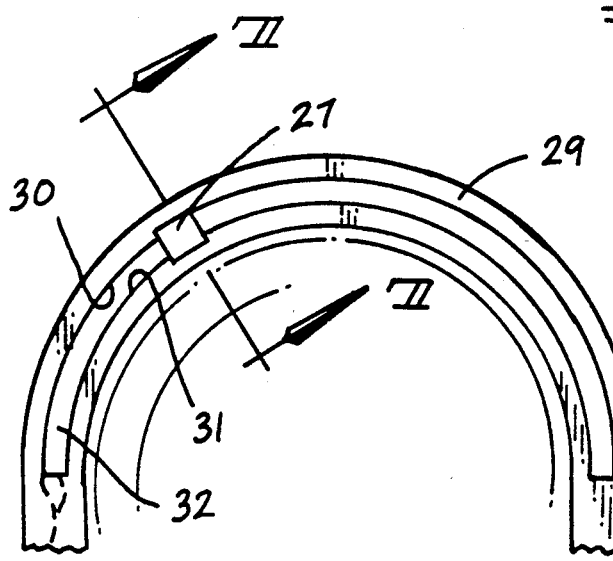
FIG. 6

RADAR DETECTION HELMET

BACKGROUND OF THE INVENTION

1. Field of the Invention

The field of invention relates to radar detector apparatus, and more particularly pertains to a new and improved radar detection helmet wherein the same is arranged to permit ease of positioning of a visual indicator within the visor opening of the helmet.

2. Description of the Prior Art

Radar detection helmets of various types have been utilized throughout the prior art and exemplified by the U.S. Pat. No. 4,719,462.

Radar detection circuitry is commercially available and exemplified by U.S. Pat. No. 4,628,857.

The instant invention attempts to overcome deficiencies of the prior art by providing for a visual indicator arranged for positioning within the visor opening, as well as an over-ride switch mounted to a lower periphery of the helmet.

SUMMARY OF THE INVENTION

In view of the foregoing disadvantages inherent in the known types of helmet apparatus now present in the prior art, the present invention provides a radar detection helmet wherein the same is arranged for ease of use and positioning of the visual indicator alarm. As such, the general purpose of the present invention, which will be described subsequently in greater detail, is to provide a new and improved radar detection helmet which has all the advantages of the prior art helmet apparatus and none of the disadvantages.

To attain this, the present invention provides a radar detection helmet arranged to include a radar circuitry, as well as a speaker member, mounted within the helmet, and further including a positionable light-emitting diode housing arranged for ease of positioning and observation of the light-emitting diode in use of the radar detection apparatus.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved radar detection helmet which has all the advantages of the prior art helmet apparatus and none of the disadvantages.

It is another object of the present invention to provide a new and improved radar detection helmet which may be easily and efficiently manufactured and marketed.

It is a further object of the present invention to provide a new and improved radar detection helmet which is of a durable and reliable construction.

An even further object of the present invention is to provide a new and improved radar detection helmet which is susceptible of a low cost of manufacture with regard to both materials and labor, and which accordingly is then susceptible of low prices of sale to the consuming public, thereby making such radar detection helmets economically available to the buying public.

Still yet another object of the present invention is to provide a new and improved radar detection helmet which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of a radar detection helmet structure, as indicated in U.S. Pat. No. 4,719,462.

FIG. 2 is an isometric bottom view of the invention.

FIG. 5 is an orthographic frontal view of the invention.

FIG. 6 is an orthographic view, taken along the lines 6—6 of FIG. 5 in the direction indicated by the arrows.

FIG. 7 is an orthographic view, taken along the lines 7—7 of FIG. 6 in the direction indicated by the arrows.

DESCRIPTION OF THE PREFERRED EMBODIMENT

Figure 3:
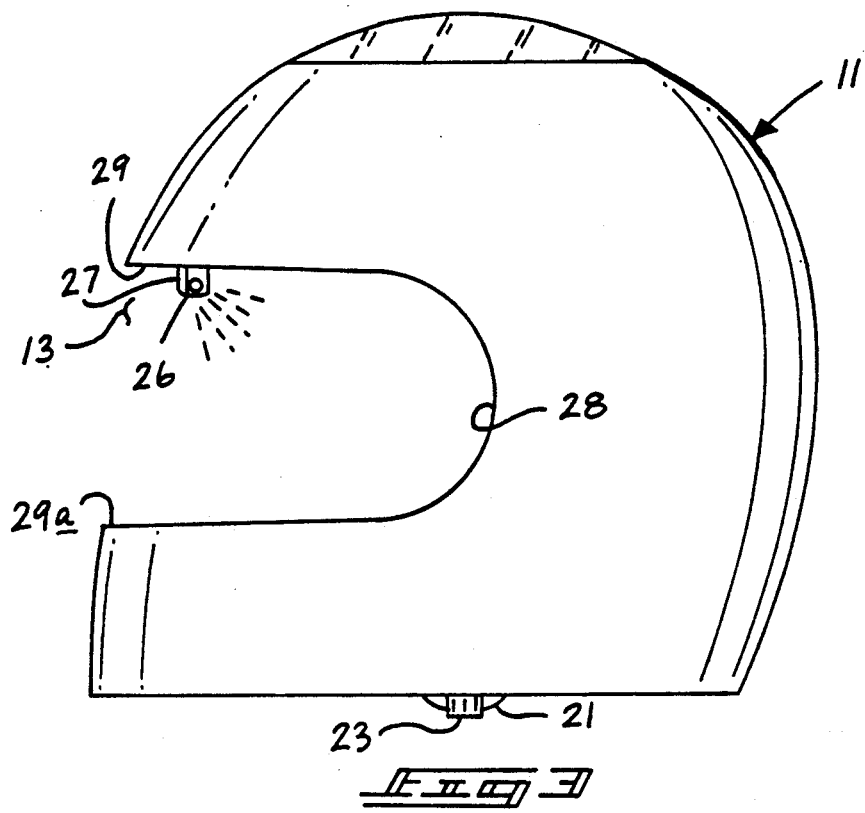
FIG. 3 is an orthographic side view of the invention.
Figure 4:
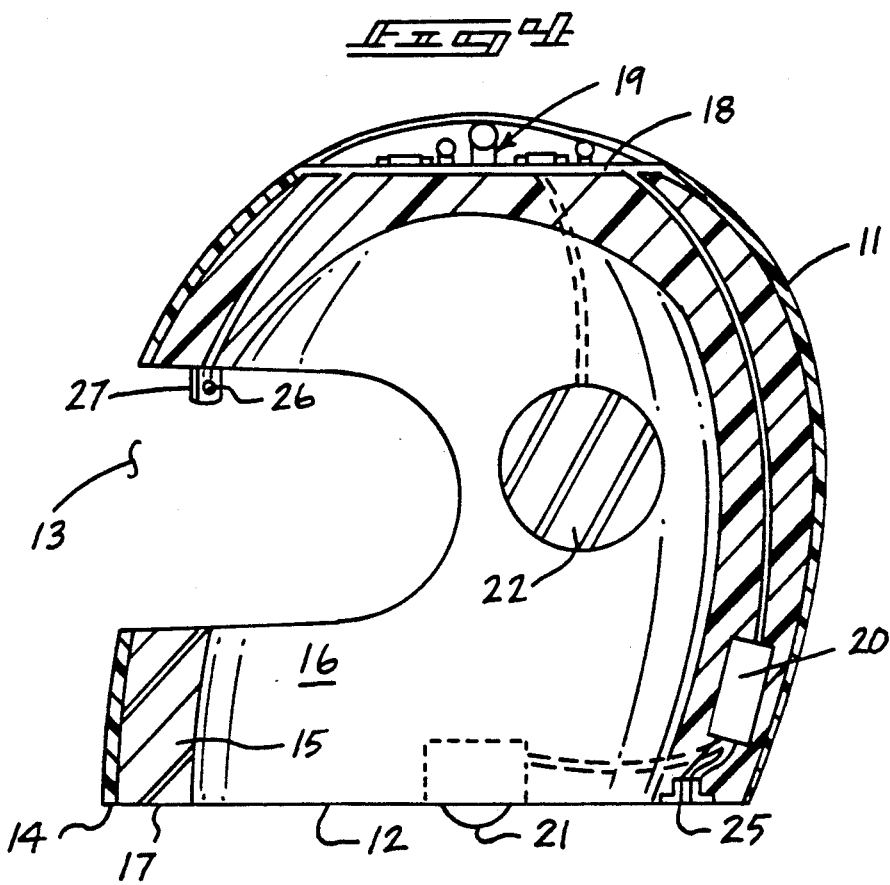
FIG. 4 is an orthographic cross-sectional illustration of the invention.
Figure 8:
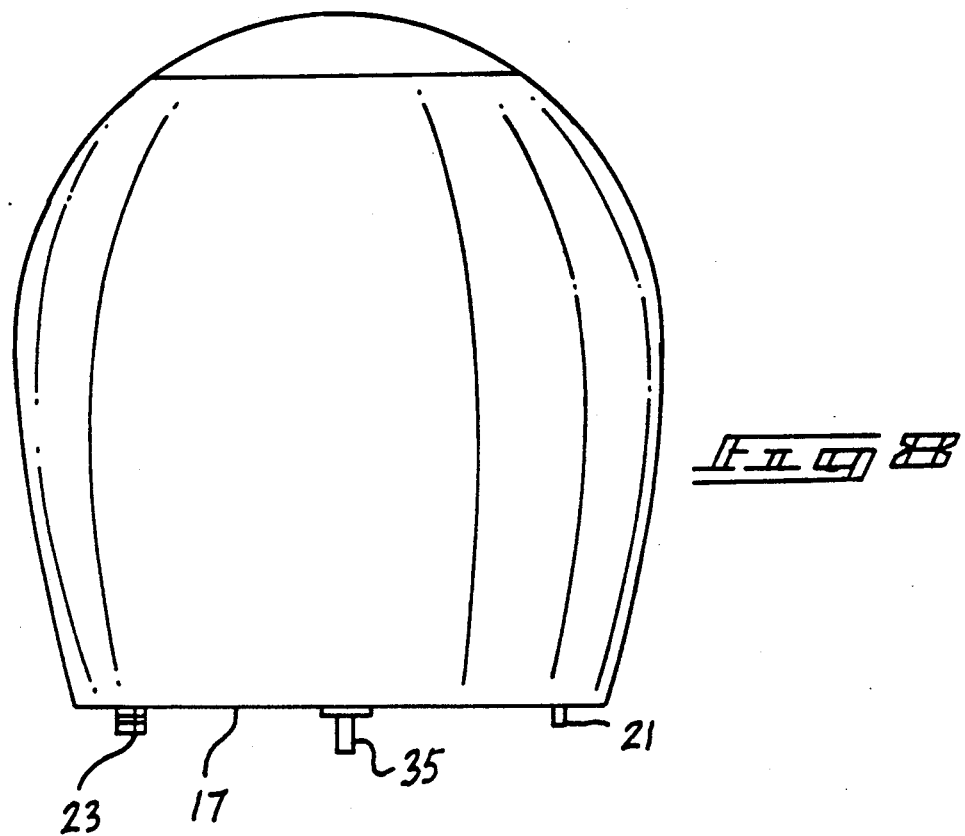
FIG. 8 is an orthographic rear view of the invention.

With reference now to the drawings, and in particular to FIGS. 1 to 9 thereof, a new and improved radar detection helmet embodying the principles and concepts of the present invention and generally designated by the reference numeral 10 will be described.

More specifically, the radar detection helmet 10 of the instant invention essentially comprises a helmet rigid shell 11 having an entrance opening 12, with the entrance opening having an entrance opening continuous end wall. A shell cavity 16 is defined within the shell 11, with the shell cavity including a resilient liner 15 coextensive therewith within the cavity 16. A liner continuous end wall 17 is positioned in adjacency relative to the entrance opening end wall 14. A visor opening 13 is directed through the shell 11 spaced from the entrance opening 12, with the visor opening including an optional visor 13a (see FIG. 2) arranged for selective securement over the visor opening 13. It should be noted that the visor opening 13 includes a visor opening continuous entrance wall 28, having an entrance wall roof wall 29 extending over a floor wall 29a. It should be further noted that a radar circuit cavity floor 18 directed into the helmet between the liner 15 and the shell 11 includes a radar circuit 19 therewithin. Such radar circuits are conventionally well known in the prior art, and an example of such is indicated in U.S. Pat. No. 4,626,857 incorporated herein by reference.

A battery 20 is mounted within the liner in adjacency to the liner end wall 17, wherein an on/off switch 21 effects selective actuation of the radar circuit 19 through the battery 20. A highway/city switch 23 is provided into the liner end wall 17 for local and distant signal reception, as well as an audio speaker 22 directed into the shell cavity 16 through the liner 15. A power supply socket 25 is provided for directing power to the circuit in conjunction with or in lieu of the battery 20. Further, securement straps 24 mounted to the entrance opening continuous end wall 14 permits securement of the helmet about an individual's head portion, in a manner as indicated in FIG. 1, relative to prior art usage.

A visual indicator light housing 27 mounting a visual indicator light 26, typically of a light-emitting diode construction, is provided. The housing 27 is mounted within the roof wall 29 of the visual opening wall 28. Respective first and second arcuate contacts 30 are arranged in a coextensive spaced relationship and are orthogonally mounted relative to the roof wall 29, with the housing arranged for sliding reception within the roof wall slot 32 that is extensive with the roof wall 29. In this manner, the first and second housing contact plates 33 and 34 mounted to the housing within the roof wall slot 32 are arranged for contiguous and electrical communication with the first and second electrical contacts 30 and 31 to permit for electrical communication between the battery 20 and the radar circuit 19, with the visual indicator light 26 permitting positioning of the housing 27 as desired within the roof wall 29 of the visor opening 13 for convenience in use by an individual.

Figure 9:
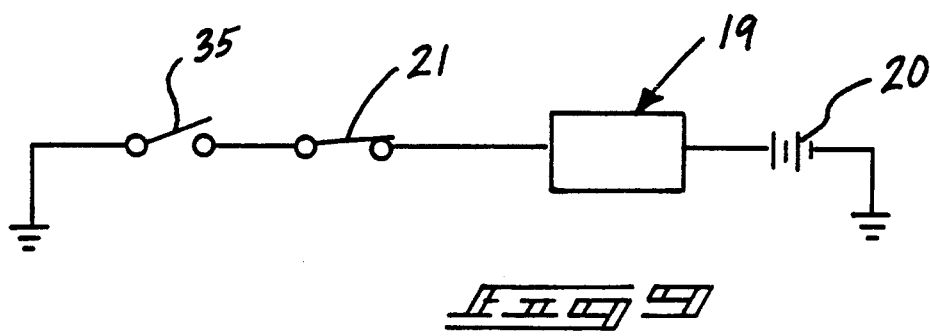
FIG. 9 is a diagrammatic illustration of an over-ride switch for use by the invention, as indicated in FIG. 8.

A normally closed over-ride button 35 is mounted within the liner end wall 17, wherein positioning of the liner upon a support surface and the like effects automatic opening of the over-ride button 35, in a manner as indicated in FIG. 9, to cease electrical communication between the battery 20 and the associated radar circuit 19 to provide for saving of the battery during periods of non-use of the organization.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A radar detection helmet, comprising, a rigid shell, having a shell entrance opening, with the shell entrance opening including a first continuous end wall, with the shell including a shell cavity within the shell, and the shell cavity including a resilient liner coextensively directed throughout the shell within the shell cavity, and the resilient liner including a second end wall positioned in adjacency to the first end wall at the shell entrance opening, and the shell further including a visor opening directed through the rigid shell, with the visor opening including a visor opening continuous entrance wall, with the visor opening continuous entrance wall including a roof wall spaced from a floor wall, and a radar circuit cavity floor positioned within the shell between the resilient liner and the shell, with a radar circuit mounted upon the cavity floor, and a battery mounted within the liner in electrical communication with the radar circuit, and an on/off switch mounted to the second end wall in electrical communication with the battery and the radar circuit to effect selective actuation of the radar circuit, and an audio speaker directed into the shell cavity through the resilient liner, and a visual indicator light housing mounted within the roof wall, and the visual indicator light housing including a visual indicator light contained therewithin directed into the shell cavity for visual observation of an individual mounting the shell, and the roof wall includes an elongate roof wall slot, and the roof wall slot includes respective first and second facing arcuate contacts that are arranged orthogonally relative to the roof wall directed into the shell liner, and the housing is slidably mounted within the roof wall slot along the roof wall, with the housing including respective first and second housing contact plates arranged in sliding and electrical communication relative to the respective first and second arcuate contacts within the roof wall slot.

2. A helmet as set forth in claim 1 wherein a normally closed over-ride button is mounted within the second end wall projecting beyond the second end wall, and the over-ride button is arranged in electrical communication between the on/off switch and the battery, wherein the normally closed over-ride button is arranged for opening upon positioning of the normally closed over-ride button upon a support surface.

* * * * *